United States Patent [19]

Carberry et al.

[11] Patent Number: 4,794,524
[45] Date of Patent: Dec. 27, 1988

[54] PIPELINED SINGLE CHIP MICROPROCESSOR HAVING ON-CHIP CACHE AND ON-CHIP MEMORY MANAGEMENT UNIT

[75] Inventors: Richard A. Carberry, Los Gatos; John P. Banning, Sunnyvale, both of Calif.

[73] Assignee: Zilog, Inc., Campbell, Calif.

[21] Appl. No.: 627,475

[22] Filed: Jul. 3, 1984

[51] Int. Cl.$^4$ .............................................. G06F 9/00
[52] U.S. Cl. .................................................. 364/200
[58] Field of Search ... 364/200 MS File, 900 MS File

[56] References Cited

U.S. PATENT DOCUMENTS 4,521,851 6/1985 Trubisky ............................ 364/200

OTHER PUBLICATIONS

"Z80 Memory Expansion for the Z800–Application Note", Mar. 1983, Zilog Inc.
"Zilog Z800 8/16-Bit Microprocessor Family", Zilog Press Release, Apr. 25, 1983.
"8- and 16-Bit Processor Family Keeps Pace with Fast RAM's", Carter et al., Electronic Design, Apr. 1983.
"Z800 Expands Z80 Instruction Set", Jasper et al., Electronic Product Design, May 1983.
"Powerful 32-Bit Micro Includes Memory Management", Alpert, Computer Design, Oct. 1983, p. 213.
"On-Chip Memory Management Comes to 8-Bit MP", Whitcomb, Electronic Design, Oct. 14, 1982.
"Z8108 Advanced Information Bulletin", Oct. 1982, Zilog Inc.
"Expanding the Z80's Memory", L. Nyugen, Computer Design, Oct. 1982.
"MC68020 32-Bit Microprocessor User's Manual", 1984, by Prentice-Hall, Inc.
"32-Bit Processor Chip Integrates Major System Functions", Alpert et al., Electronics, Jul. 14, 1983, p. 113.
"Preliminary Product Specification", Zilog Inc., Sep. 1983.
"Z80,000 32-Bit Microprocessor", Yamamura et al., presented at Weston, Oct. 1983.

Primary Examiner—Raulfe B. Zache
Assistant Examiner—Florin Munteanu
Attorney, Agent, or Firm—Majestic, Gallagher, Parsons & Siebert

[57] ABSTRACT

A 32-bit central processing unit having a six-stage pipeline architecture with a cache memory and memory management unit all provided on a single integrated circuit (I.C.) chip but without any peripheral interface input/output circuits, clock or similar circuits on the chip in order to utilize the limited I.C. area for implementing the processor functions that most directly affect speed of operation and other performance factors.

10 Claims, 12 Drawing Sheets

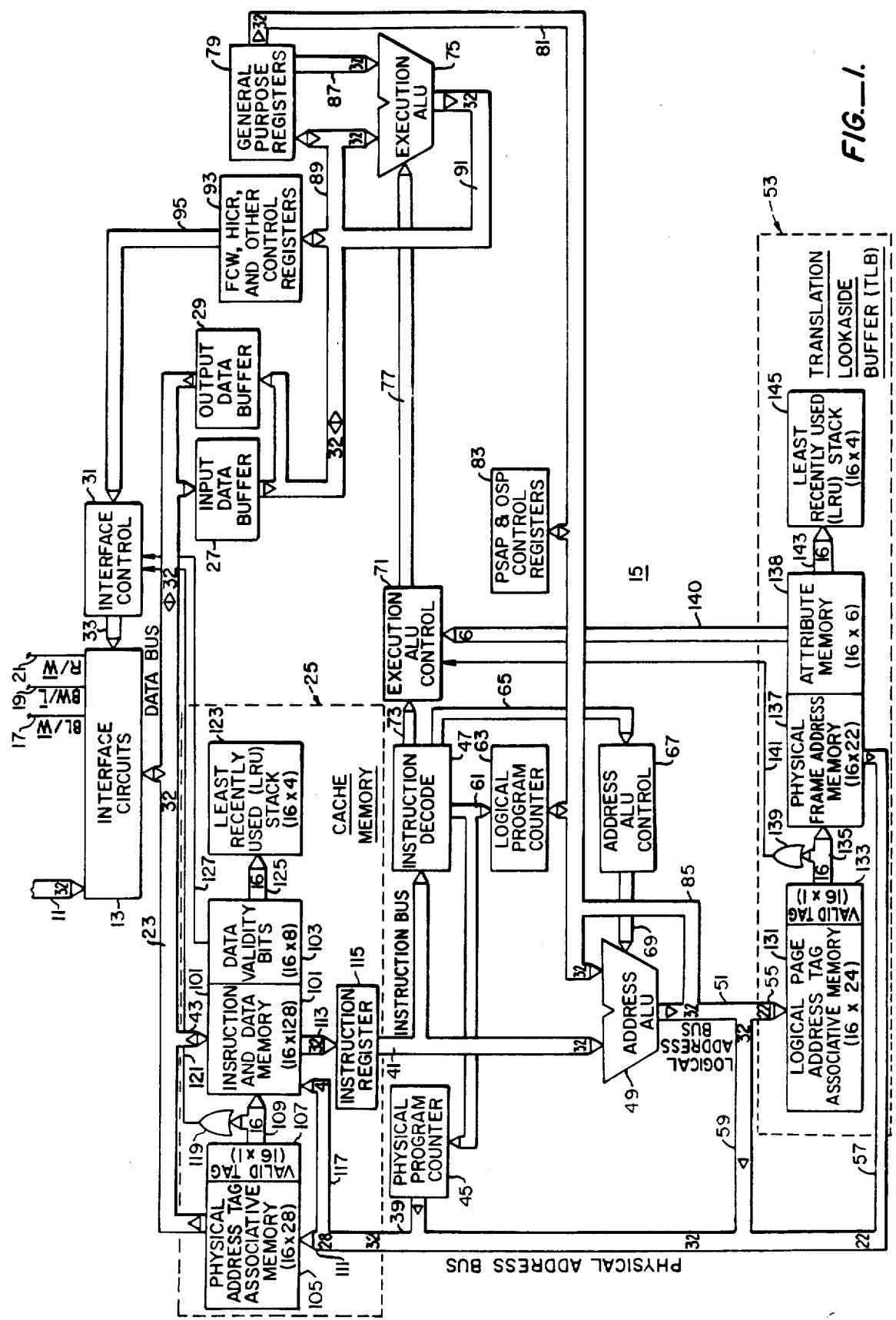
FIG._1.

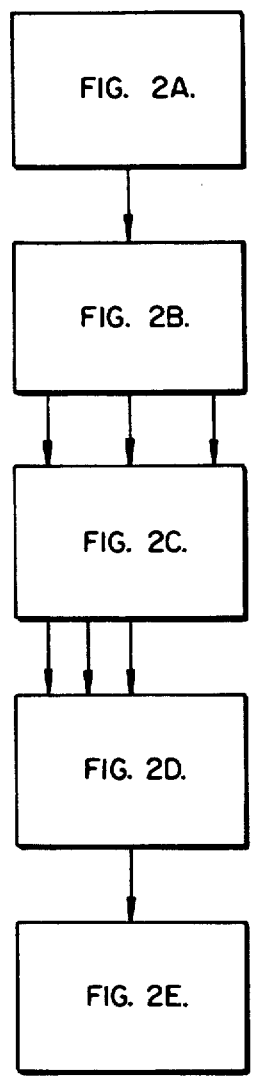
FIG._2.

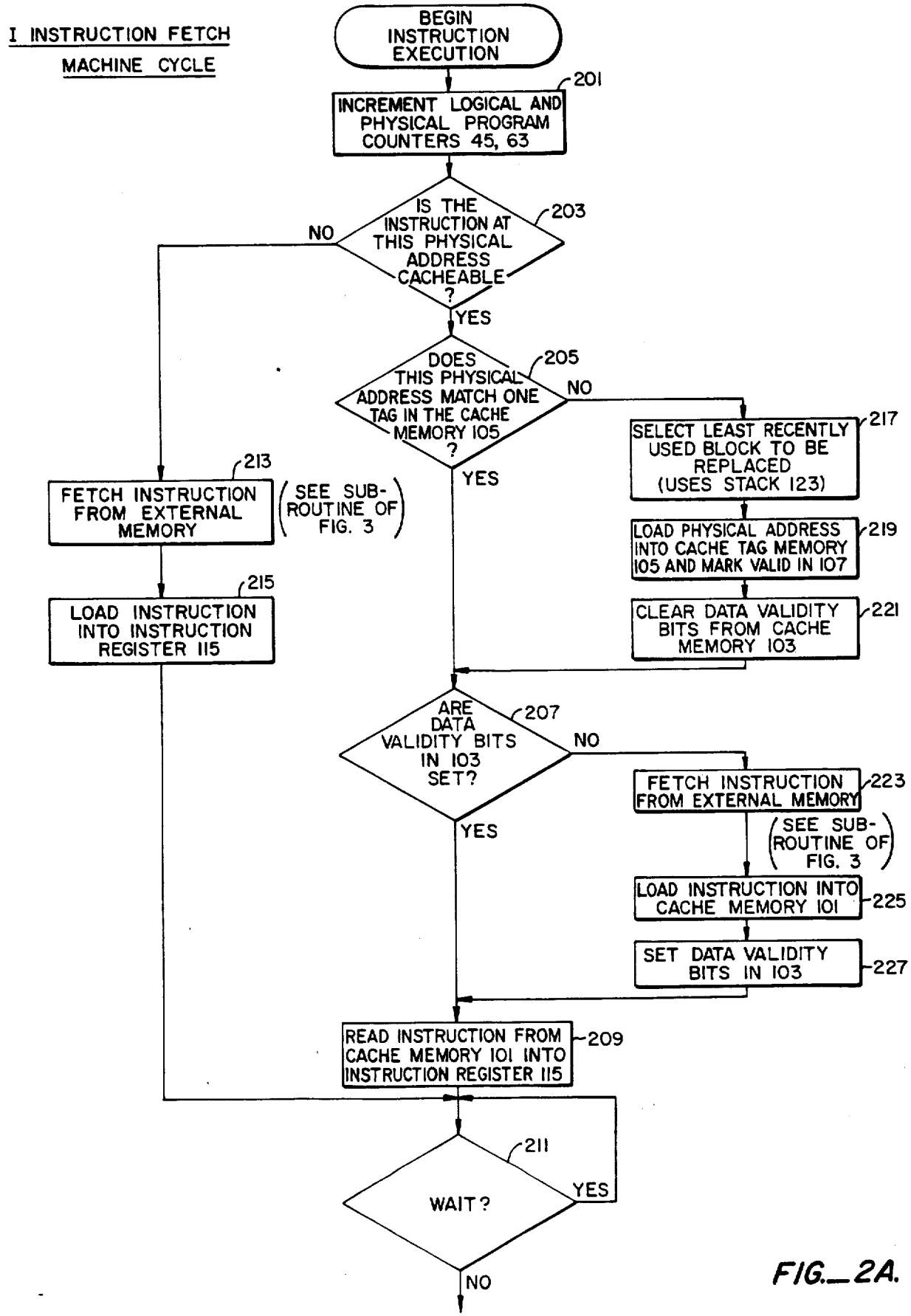
FIG._2A.

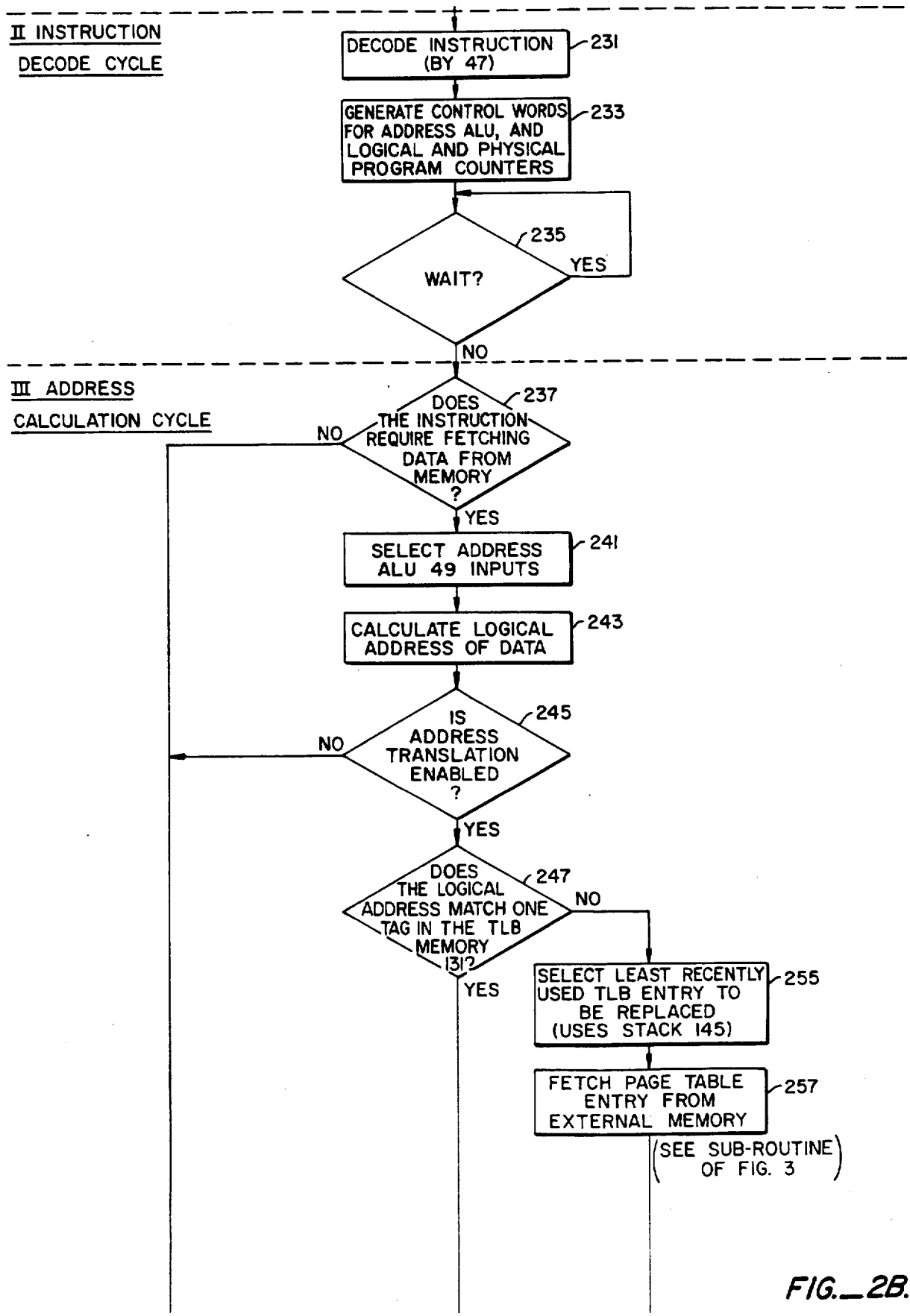
FIG._2B.

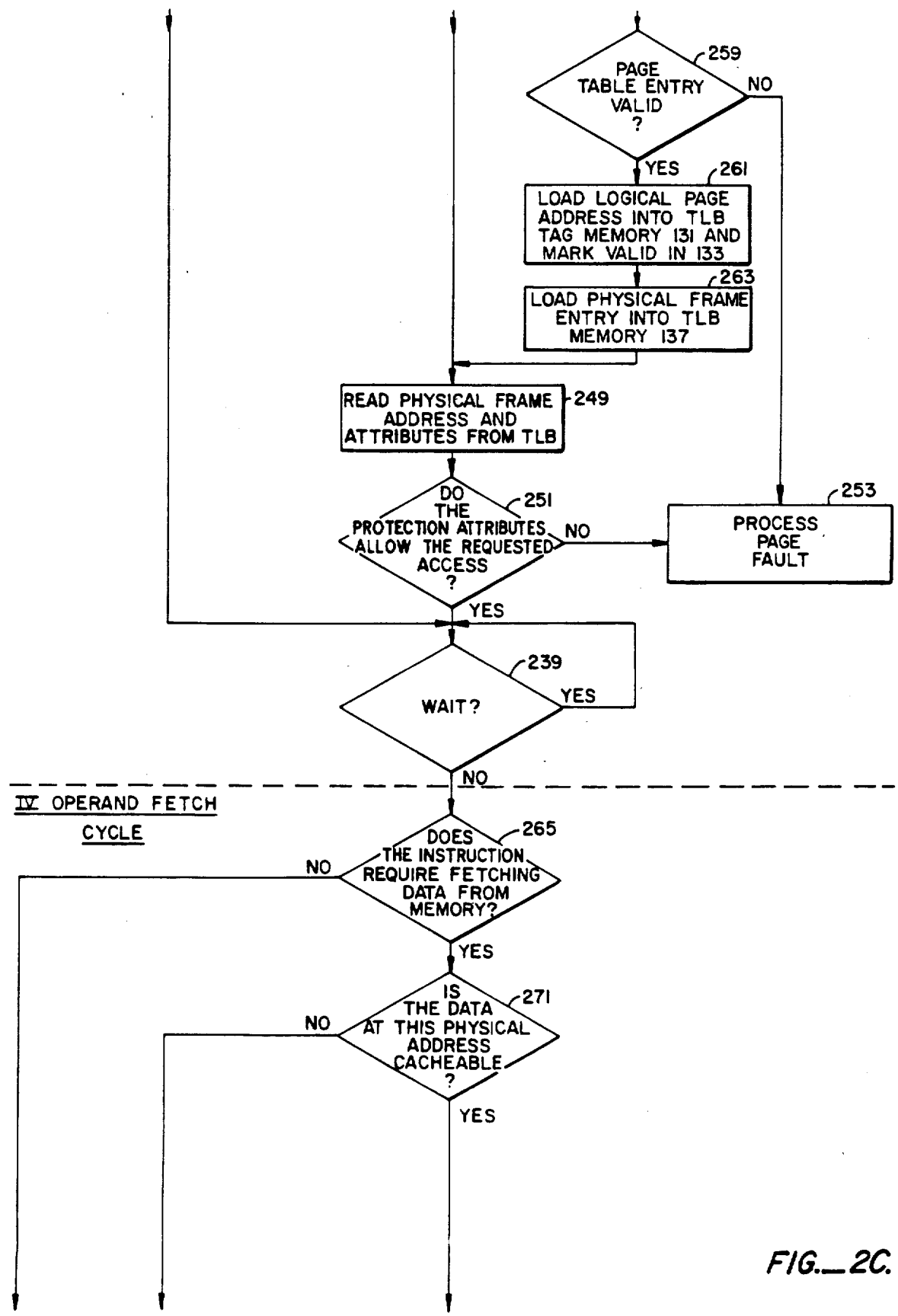
FIG._2C.

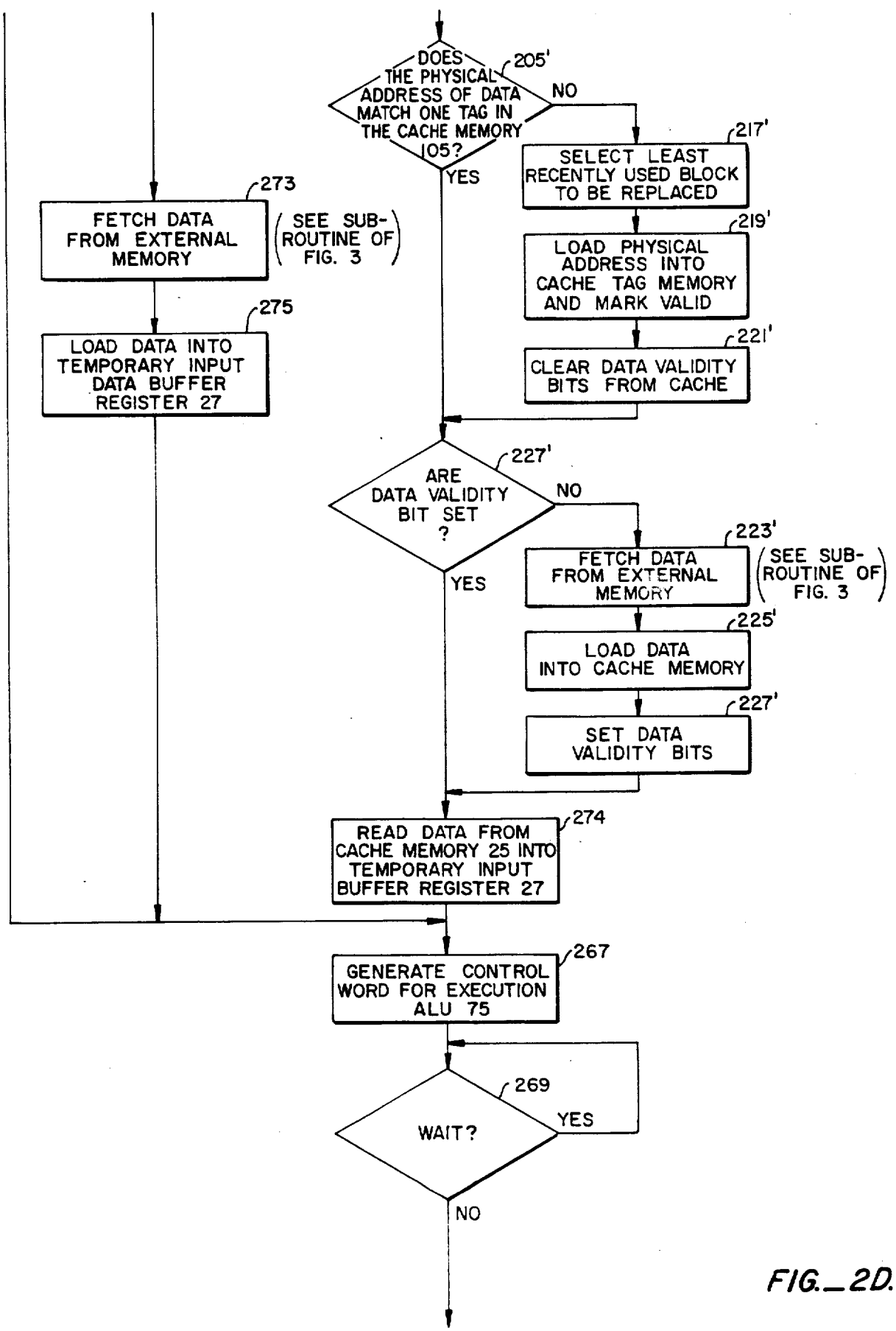
FIG._2D.

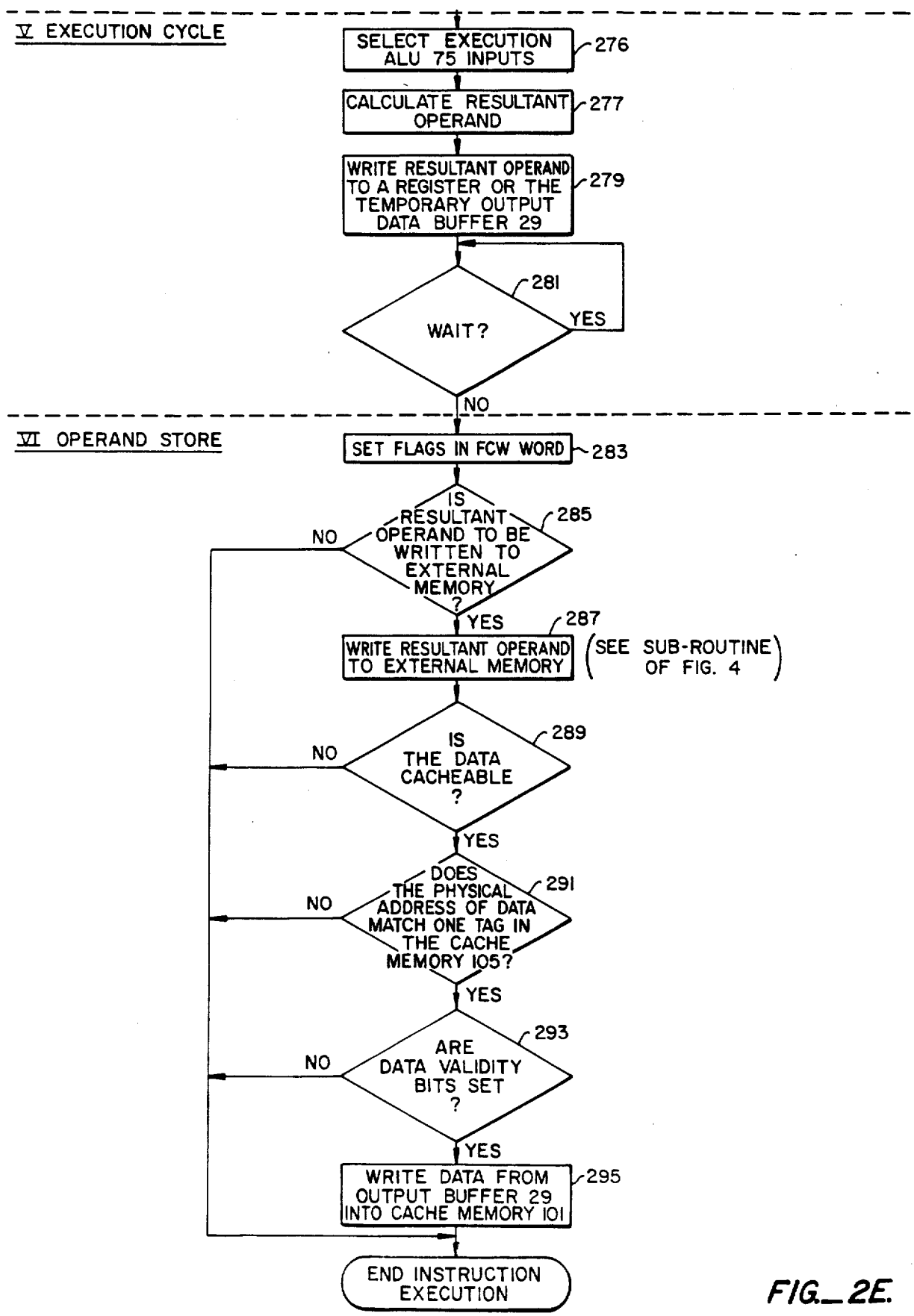
FIG._2E.

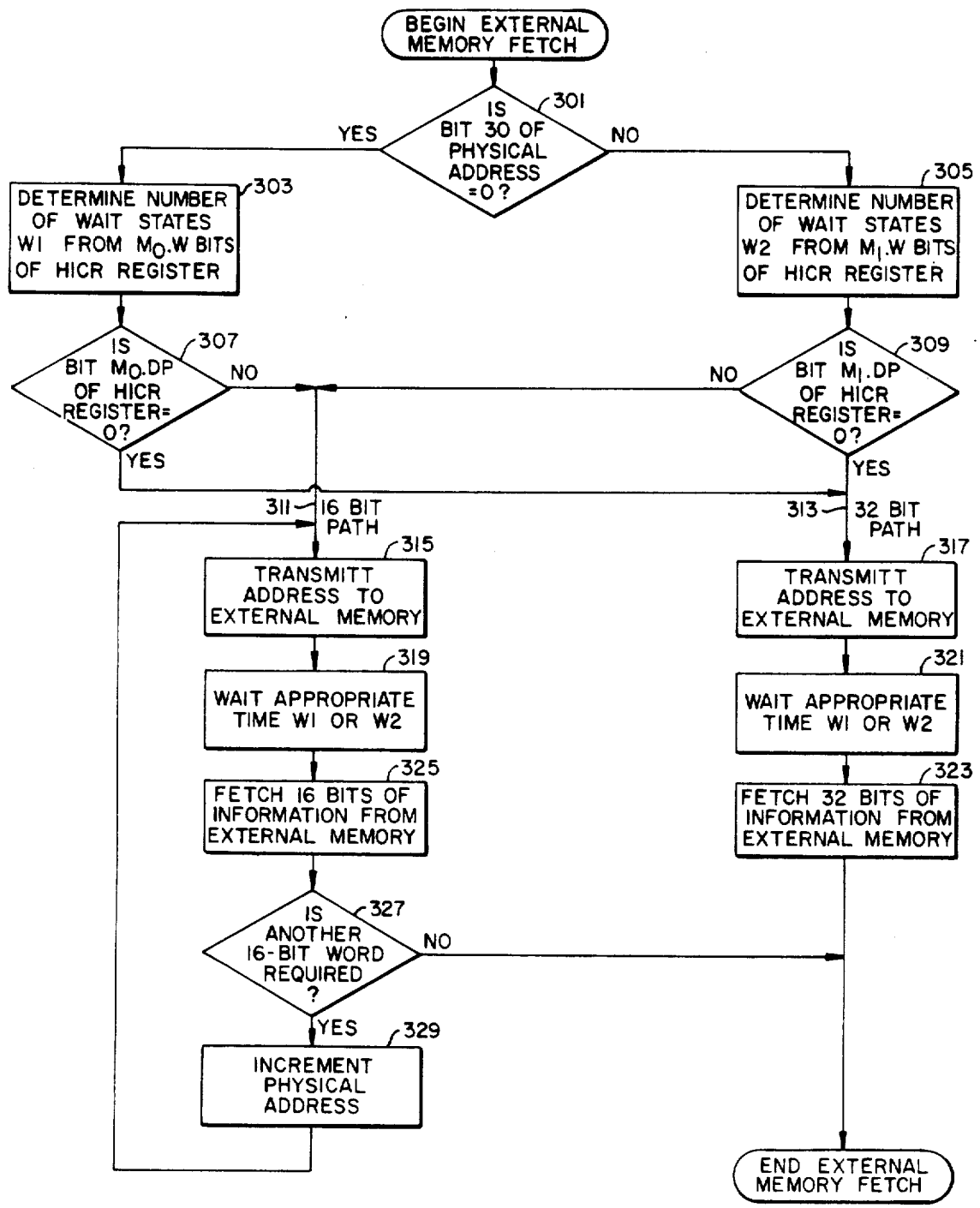
FIG._3.

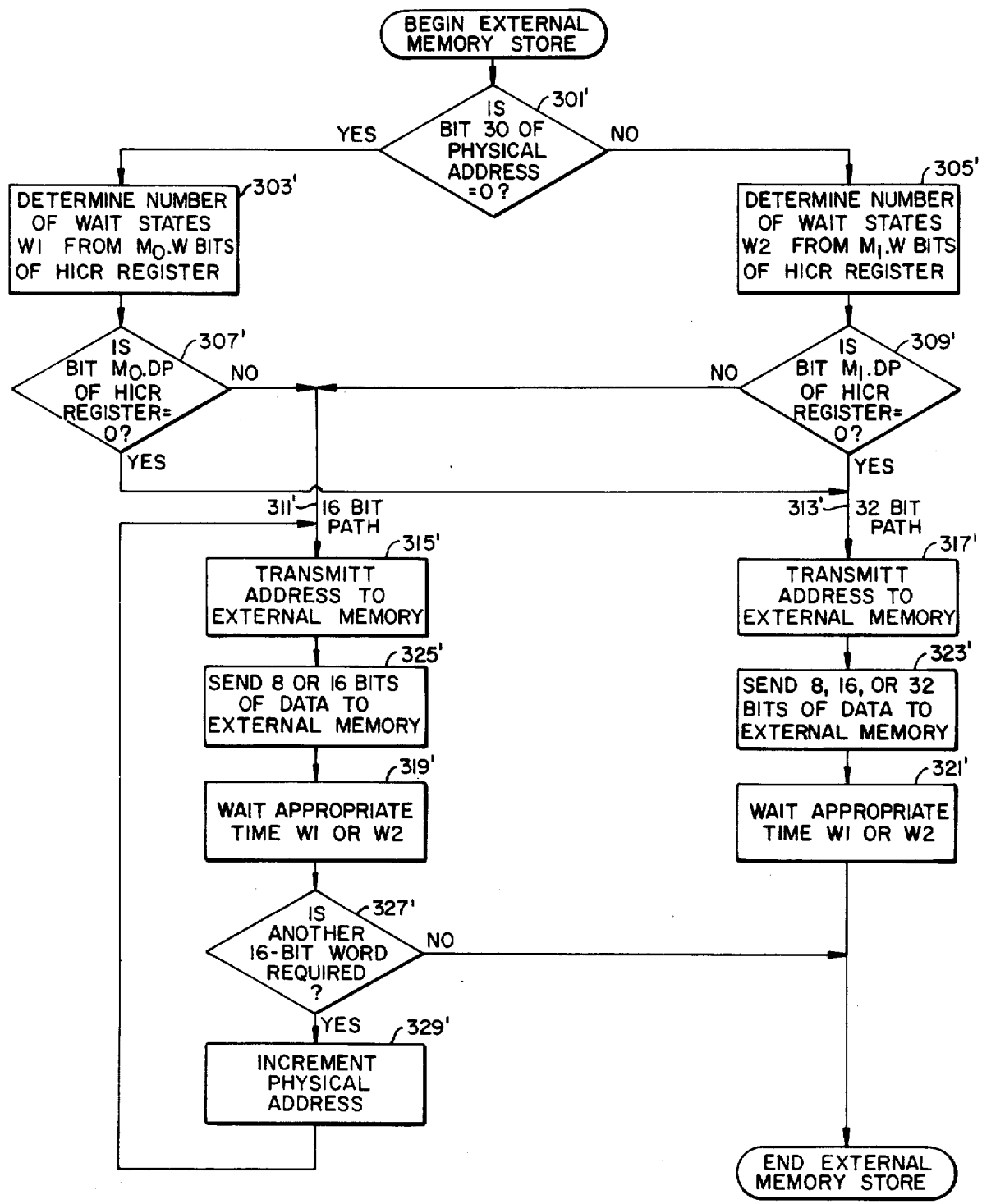
FIG._4.

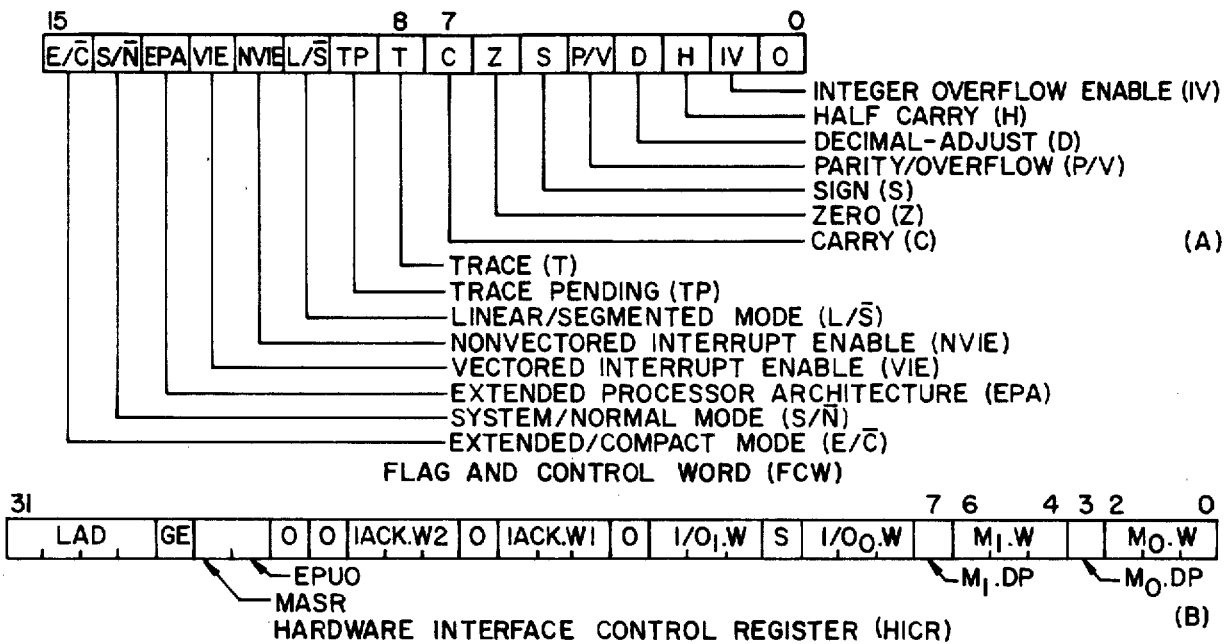
FIG._5.
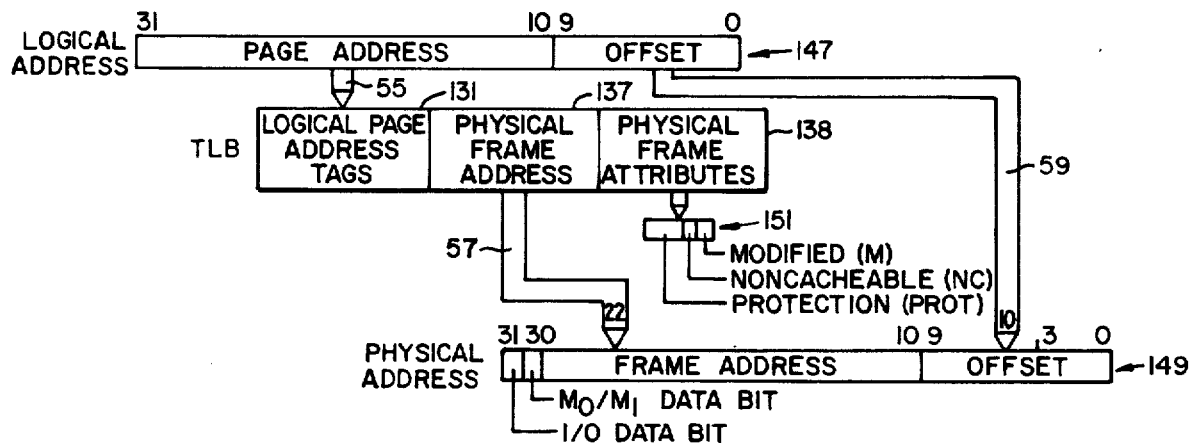
FIG._6.
PROTECTION (PROT) FIELD ENCODING
| ENCODING | SYSTEM | NORMAL (USER) |
|---|---|---|
| 0 0 0 0 | NA | NA |
| 0 0 0 1 | RE | NA |
| 0 0 1 0 | RE | E |
| 0 0 1 1 | RE | RE |
| 0 1 0 0 | E | NA |
| 0 1 0 1 | E | E |
| 0 1 1 0 | R | NA |
| 0 1 1 1 | R | R |
| 1 0 0 1 | RW | NA |
| 1 0 1 0 | RW | R |
| 1 0 1 1 | RW | RW |
| 1 1 0 0 | RWE | NA |
| 1 1 0 1 | RWE | E |
| 1 1 1 0 | RWE | RE |
| 1 1 1 1 | RWE | RWE |
NA—no access is permitted
R—read access is permitted
W—write access is permitted
E—execute access is permitted
FIG._7.

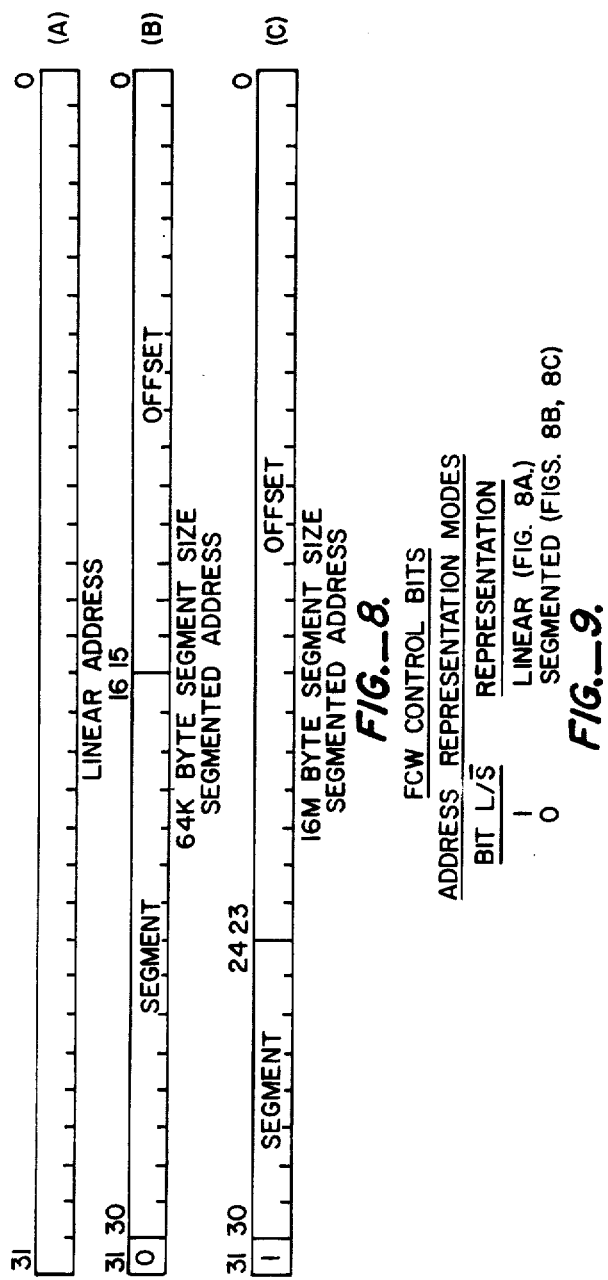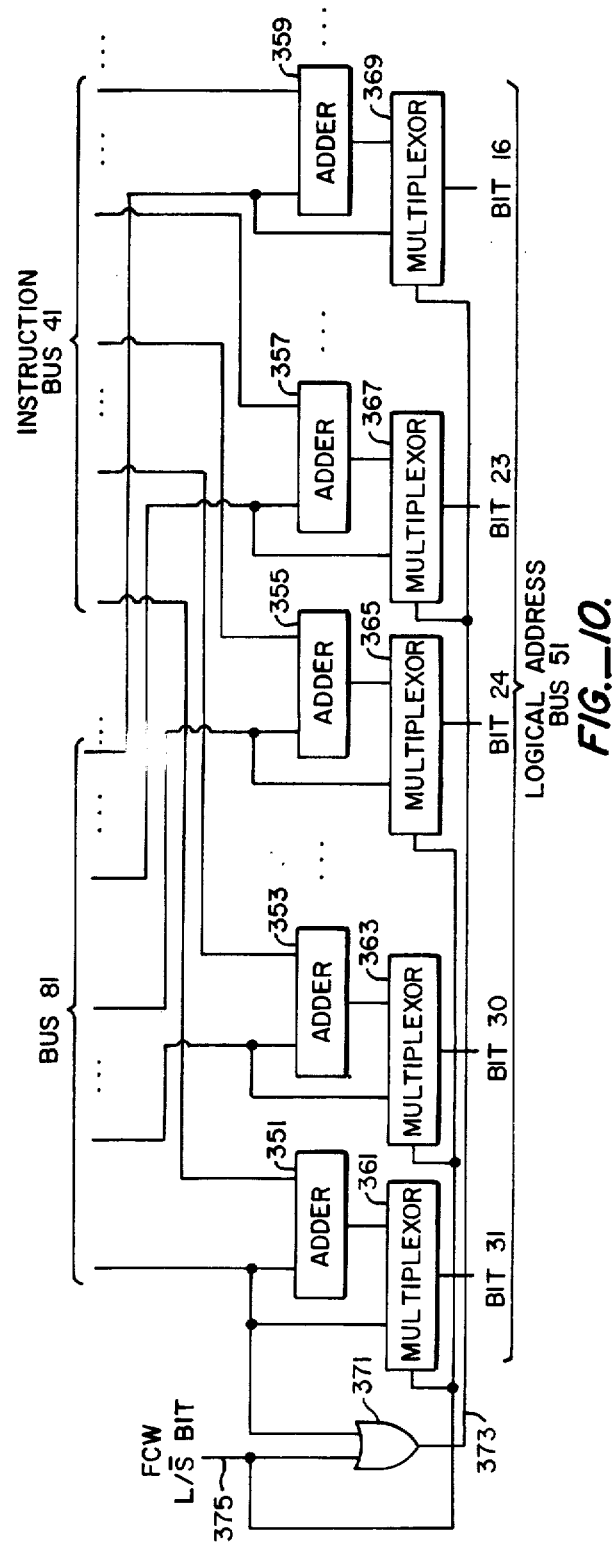

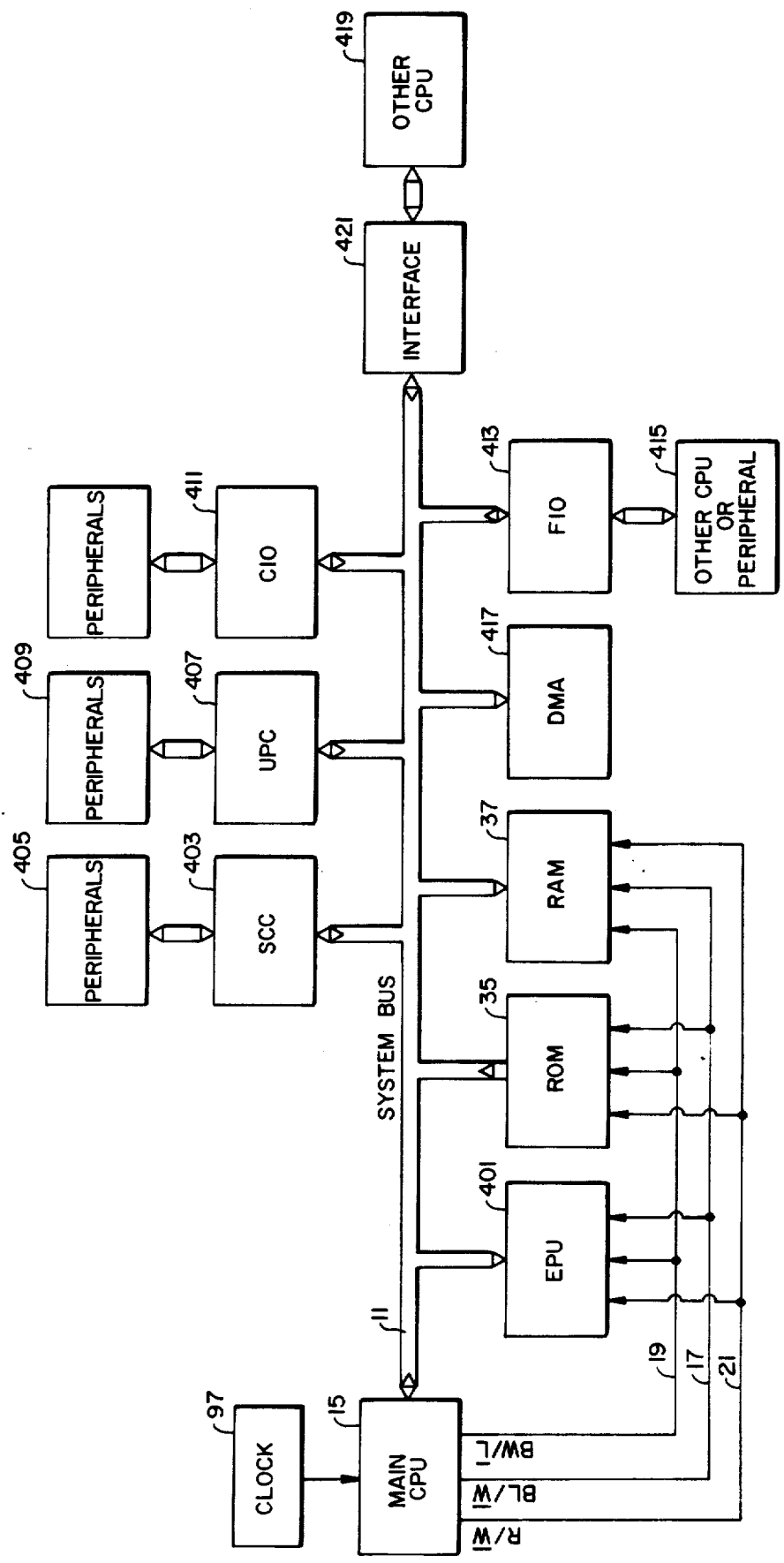
FIG._11.

PIPELINED SINGLE CHIP MICROPROCESSOR HAVING ON-CHIP CACHE AND ON-CHIP MEMORY MANAGEMENT UNIT

BACKGROUND OF THE INVENTION

This invention relates generally to computer central processing units, and particularly to a high performance unit on a single integrated circuit chip.

The development of single intergrated circuit chip microprocessors and microcomputers has been rapid since their initial introduction in the early 1970's. The first generation of such devices processed four bits of data at one time, followed quickly by an eight-bit processor. More recently, 16-bit processors have become commonly used and 32-bit processors are coming to the market. One primary goal in the evolution of processors is to maximize their performance (i.e. the speed of operation, capability and flexibility to the user) on a single chip that is small enough that manufacturing yields of the chip are sufficiently high.

Therefore, it is a primary object of the present invention to provide a unique central processing unit architecture and function that processes data at a high rate of speed and which has other improved capabilities.

SUMMARY OF THE INVENTION

This and additional objects are accomplished by the various aspects of the present invention, wherein, briefly and generally, a pipelined processor is provided with the ability to perform a plurality of steps during a single processor cycle whose number is equal to the number of pipeline stages. In order to increase the speed of operation of the pipeline processor, a cache memory is provided on the chip so that rapid access may be had to frequently used information by eliminating the necessity to access that information from an external memory each time it is required. A memory management unit is also provided on the chip in order to speed up the translation of the logical memory address of data into its physical address for accessing from external memory or the cache memory. With the ability of the processor circuits to have on-chip access to physical addresses, protection bits and other information that is included with the physical address may be more rapidly accessed since reference to the external memory is avoided in those cases.

In a preferred form of the invention, only those processing functions which cooperate to maximize the performance of the processor are provided on the integrated circuit chip. Since there is an economic limit as to how large the integrated circuit chip may become, the number of functions that can be provided as part of a single chip processor are necessarily limited. By including those functions identified above and excluding other functions, such as a clock generating circuit, a floating point processor, and peripheral interface input-/output circuits, the performance is maximized for a given size of chip. By building a chip with circuits to provide the selected functions mentioned above, and excluding others, it has the further advantage in that the design will easily accommodate future improvements in semiconductor processing that will undoubtedly result in the ability to include an increased number of circuits on the same size chip. The cache memory and memory management unit can then be expanded to further improve the speed of the device by maintaining more instructions, data and address translation tables on the chip itself for rapid access, all with minimum processor redesign.

According to a specific embodiment of the invention, as described hereinafter, there are six pipeline stages of processing. Separate arithmetical logic units are provided for calculating addresses and resultant operands. The memory management unit, in a manner similar to the cache memory, uses a technique to load into its memory a required part of the logical/physical address translation table from the external memory, when necessary, that replaces the least recently used part of that table in the already full memory management unit.

The various aspects of the present invention are being commercially embodied in the Z80,000 Central Processor Unit of Zilog, Inc., Campbell, Calif., assignee of the present application. The following specification and articles relating to this product, all published within one year of the filing date of this application, are expressly incorporated herein by reference:

1. "32-Bit Processor Chip Integrates Major System Functions", Alpert, et al., *Electronics*, July 14, 1983, page 113;

2. "Preliminary Product Specification" of Zilog, Inc., September, 1983;

3. "Z80,000 TM 32-Bit Microprocessor", Yamamura, et al., presented at Wescon, October, 1983;

4. "Powerful 32-Bit Micro Includes Memory Management", Alpert, Computer Design, October, 1983, page 213; and 5. "Issues in 32-Bit Microprocessors: The Zilog Position", a press release of Zilog, Inc.

Additional objects, features and advantages of the present invention will become apparent from the following description of a preferred embodiment thereof, which description should be taken in conjunction with the accompanying drawings.

BRIEF DESCRIPTION OF THE DRAWINGS

FIG. 1 is a block schematic diagram of a single-chip central processing unit that utilizes the various aspects of the present invention;

FIG. 2, comprising FIGS. 2A through 2E is a flow diagram showing the operation of the central processing unit of FIG. 1;

FIGS. 3 and 4 are flow diagrams showing subroutines of the flow diagram of FIG. 2;

FIG. 5 illustrates the format of two control registers of the central processing unit of FIG. 1;

FIG. 6 illustrates the operation of the translation lookaside buffer of FIG. 1;

FIG. 7 lists protection bit patterns of a few physical frame attributes as shown in FIG. 6;

FIG. 8 illustrates the available formats of memory address words for the central processing unit of FIG. 1 which may be selected by the user of the unit;

FIG. 9 lists a control bit of a control register of the central processing unit of FIG. 1 that selects one of the formats illustrated in FIG. 8;

FIG. 10 is a circuit diagram of a part of one block of the system of FIG. 1; and FIG. 11 shows an example of a computer system that uses the single chip central processing unit of FIGS. 1–10.

DETAILED DESCRIPTION OF A PREFERRED EMBODIMENT

Referring to FIG. 1, the architecture of a 32-bit central processing unit integrated circuit chip is shown in block schematic diagram form. The circuit chip illustrated in FIG. 1 is, of course, packaged in some appropriate way (not shown) with conductive pins extending from the package and connected to the circuit chip. A few of the external pin connections are shown in FIG. 1. A 32-pin bus 11, connected to interface circuits 13 on the chip, serves to carry addresses and data between the chip and external components. The bus 11 is time shared between address and data information. An example computer system shown in FIG. 11 utilizes a central processing unit (CPU) 15 which is that being described with respect to FIG. 1. In addition to the address/data bus 11, three control lines 17, 19 and 21 are shown to communicate between the chip of FIG. 1 and other components of a system such as illustrated in Figure 11. Of course, there are many other control lines for other functions that are not shown in the drawings.

A 32-bit bus 23 is provided on the chip for communication of addresses and data between the interface circuits 13 and other circuits, as shown in FIG. 1. One of these circuits is a cache memory 25. Also, an input data buffer register 27 and an output data buffer register 29 are provided for temporary storage of data either being brought into the circuit of FIG. 1 from an external memory or other device, or data that is being communicated out to external devices, respectively. The interface circuits 13 are controlled by interface control circuits 31 that are connected therewith through a small control bus 33.

In the CPU architecture of FIG. 1, the cache memory 25 stores on the chip the most often used of the program instructions and data that normally reside in external memory, such as a read only memory 35 and random access memory 37 shown in FIG. 10. The time required to access these instructions and data is thus significantly reduced since, without the on-chip cache memory 25, several clock cycles worth of time are required to access and fetch data from external memory. The cache 25 responds to an address on a physical address bus 39. By a "physical" address is meant that actual address of the instruction or data in external memory. Data and instructions are stored in the cache 25 with the same physical address as in external memory. In response to such an address on the bus 39, an instruction to be retrieved appears on an input instruction bus 41 from the cache memory 25. Alternatively, a physical address of data is presented on the bus 39, that data is placed on the internal bus 23 through a bus connection 43. The data is thus made available for use by other components of the processor by communication through the input data buffer 27. The physical address of a desired instruction in the cache 25 is generated by a physical program counter 45. A physical address of data to be read out of the cache 25 is generated by other elements described below.

When a program instruction is read out of the cache 25 onto the instruction bus 41, it is applied to an instruction decoding circuit 47 and one input of an arithmetic logic unit 49 that is dedicated to the function of calculating the logical memory address of data that is necesary to be retrieved in order to carry out the instruction on the instruction bus 41. By "logical" address is meant that location of the data which is specified in the control and programming instructions, not the physical location of the data in external memory. It is logical address that is the result in a logical address bus 51 of an address calculation by the ALU 49.

As is well known, computer programmers deal with logical addresses and leave it to the executing processor to translate the logical addresses into the physical memory addresses necessary for accessing the data. A logical/physical translation table is stored in external memory for any particular program. The most frequently used portion of that table is stored in a memory management unit 53. In response to a logical address in an input 55 of a logical memory page desired to be accessed, the memory management unit 53 provides at an output 57 a physical address of the memory frame where that data exists. As described below with respect to FIG. 6, this physical page address in the output 57 is combined with offset bits of a logical address through a bus portion 59 that bypasses the memory management unit 53. The bus portion 59 further allows bypassing the memory management unit 53 altogether when executing a program where the logical addresses can be made equal to the physical memory addresses, such as in industrial control applications. By having the most recently used portion of the logical/physical address translation table from the external memory on the chip itself, access time for making the translation is reduced. Additionally, since certain attributes of the data are also stored as part of the physical address in the translation table, access to these attributes is made much faster so that a prompt response to them can be had.

The cache memory 25 and the memory management 53 are similar in that they store on the chip the most frequently used portions of information stored in an external memory. The cache 25 stores program instructions and data (operands), while the memory management unit 53 stores a portion of the logical/physical translation table in external memory. They both operate to read their respective pieces of information from external memory into their own memory if that information is not already there when access is desired. The new information replaces the least recently used information in their respective memories. The structure and operation of these circuit portions is explained in greater detail below.

One output 61 of the circuit 47 that decodes an instruction in the instruction bus 41 is applied to the physical program counter 45. This path is utilized when a decoded instruction requires the program counter 45 to be jumped to a new program address. As is well known, the program counter generally increments sequentially for accessing successive instructions that are organized in order in memory. Such jump commands are also applied to a logical program counter 63 that maintains the logical address of the instruction for relative addressing, or in case there is some exception, fault or malfunction that requires the circuit to remember what the logical address was in the previous step.

Another output 65 of decoding circuits 47 is applied to circuits 67 which control the operation of the address ALU through a short control bus 69. The address ALU control 67 is one of three circuit portions shown n FIG. 1 that controls the operation of the processor. The interface control 31 has already been mentioned. Another is a control circuit 71, connected to the decoding circuits 47 through a control bus 73, which controls the operation of a second arithmetic logic unit 75 through a control bus 77. Each of these controlling circuits may conveniently be a suitable logic array.

In order to temporarily store data, a number of general purpose registers 79 are provided on the chip. These registers can be accessed to read their contents at any one of three outputs. One output 81 provides a second input to the address ALU 49. The output bus 81 is also connected to two control registers 83 that are particularly associated with the address calculation function of the ALU 49. The count of the logical program counter 63 is also made accessible through the bus 81 by that second input of the address ALU 49. Additionally, the existing logical address at the output 51 is connectable by a bus segment 85 to that second input and is utilized when the control circuit 67 determines that the logical address output is required for calculating the next data address.

A second output 87 of the general purpose registers 79 is connected to one input of the arithmetic logic unit 75. The function of the ALU 75 is to perform on two sets of data presented to it the arithmetical calculation specified by the control circuits 71 which executes a previously fetched program instruction. A second input to the ALU 75 is a connection with a bus 89 that is the third output of the general purpose register 79. That connection is also an input to the registers 79 which allows new data to be written into them. A bus segment 91 is connected between an output of the ALU 75 and the bus 89. This connection allows the ALU 75 output to be stored in one of the general purpose registers 79 or to be sent by way of the output data buffer 29 to external memory. A group of control registers 93 are also connected to the bus 89 in a manner that information can be read from them or written into them through that bus.

The format and content of two of the control registers 93 are illustrated in FIG. 5. FIG. 5(A) shows the flag and control word (FCW) and the hardware interface control register (HICR) as shown in Figure 5(B). A small bus 95 communicates the contents of the HICR register to the interface control circuits 31 for its use, as described below.

The operation of the entire circuit of FIG. 1 is controlled, as is usual, by an external clock, such as a clock circuit 97 of FIG. 10. In a specific form, the clock operates at a 10 MHz rate. Two clock cycles are included in each processor cycle. Therefore, the processor operates at a rate of 5MHz.

The processor described with respect to Figure 1 has a pipelined architecture. That is, a number of operations are performed simultaneously in order to increase the overall performance of the processor. In this particular example, six processing stages are provided in the pipeline. The pipeline stages can be summarized as follows:

1. Instruction Fetch: A program instruction is read out of the cache memory 25 onto the bus 41. If the desired instruction is not in the cache memory 25, it is first obtained from external memory.

2. Instruction Decode: The controlling program instruction obtained in Step No. 1 above is decoded by the circuits 47 in order to control the various other portions of the system in a manner to carry out the instruction.

3. Address calculation: In response to the decoded program instruction and other information in the registers, the address arithmetic logic unit 49 calculates a logical address of an operand (data) that needs to be fetched or stored for carrying out the fetched instruction.

4. Operand (data) Fetch: During this step, the data whose address was calculated in the previous step is fetched from the cache memory 25, and the if not in that memory, first loaded from external memory. The data becomes available in the input data buffer 27 for use in the next processing step.

5. Execution: The fetched data in the buffer 27 and other data in an appropriate general purpose register 79, depending upon the instruction being executed, are processed by the ALU 75 (multiply, divide, add, etc.) in a manner specified by the program instruction.

6. Operand Store: The result of the calculation by the ALU 75 is then stored, generally being written into the output buffer 29, thereafter written to external memory through the system bus 11, and possibly also to the cache memory 25.

Therefore, in six steps, a program instruction is fetched, executed, and the result stored back in an appropriate memory or register. At any one time, six such operations are going on at once, each of the six stages handling one of the steps in executing a different program instruction. For example, the operand is being fetched (Step No. 4) in executing one instruction, and the operand address is being calculated (Step No. 3) for the next succeeding program instruction.

As is more apparent from the detailed description of the processor's operation with respect to FIG. 2 that follows, each pipeline stage function is accomplished in one processor cycle, except in certain cases. One such case is where the external memory needs to be accessed to bring into the cache 25 or memory management unit 53 information from the external memory. Another is where the program instruction itself is so complicated as to require more than one cycle of processing time. Another exception is with branch instructions, where the next instruction cannot be entered into the pipeline until the branch instruction has been completely executed. Another example of an exception is when data that is a result of executing one instruction must be read as part of the address calculation in the execution of the next instruction. Hence, the result of such an exceptional circumstance is to stop the pipeline processor for a time. The processor architecture and its manner of operation is designed to minimize these occurrences so that its performance approaches the ideal of accomplishing the execution of one instruction per processor cycle.

Before describing operation of the processor of FIG. 1 with respect to the flow diagrams of FIG. 2, additional details of the structure and operation of the cache memory 25 and memory management unit 53 are provided.

The cache memory 25, in this specific example, is designed to hold 16 blocks of information, the information in each block being program instructions or data. This information is stored in a memory 101 wherein each block is 128 bits long. In addition, there are eight validity bits for each block in an associated memory 103. That is, there are 16 bytes of instructions or data in each block in the memory 101, and one validity bit in the memory portion 103 is associated with each two bytes. Twenty-eight bits of the physical address for each block of instructions or data in the memory 101 are contained in the memory 105 which additionally contains a validity bit for each block in a memory portion 107. Memory 105 is of an associative type, which means that an output will be obtained in one of the 16 output lines 109 (one line for each of the 16 blocks of information) if an address in an input 111 matches that of any one address in the memory portion 105. The output in one of the lines 109 then serves to enable the memory portion 101, so that data is read out through bus connection 43 and instructions are read out through a bus 113 into an instruction register 115 for temporary storage. The first four bits of the physical address, bits 0-3, are applied to a bus portion 117 from the physical address bus 39 to the memory portion 101 to select the portion of the information block in that memory that is to be read out through either of the buses 43 or 113. The remaining bits of the 32-bit physical address are applied from the physical address bus 39 to the bus 111 that is connected to the associative memory 105.

An OR-gate 119 has the 16 lines of the bus 109 as its inputs. Whenever there is a positive comparison between the physical address in the bus 111 and one of the 16 stored in the associative memory 105, an output in the line 121 of the OR gate 119 will indicate a "hit". That is, it indicates that the physical address on the bus 111 exists in the memory 105, and that a block corresponding to that address exists in memory 101. A signal in the line 127 indicates whether the addressed instruction or data in that block is valid or not. If a signal is not detected in either of the lines 121 or 127 when a physical address is applied to the associative memory 105, that means that the desired information is not in the cache memory since none of the lines 109 will indicate it. When the interface control circuits 31 detect a "miss" in either of the lines 121 and 127, then the desired instruction or data is first loaded into the cache memory 25, as explained below with respect to the flow diagrams of FIGS. 2 and 3. When this occurs, a stack memory 123 is utilized, being connected to the memory portions 101, 103 by a bus 125. The buses 109 and 125 are connected. The stack memory 123 contains a four-bit word for each of the 16 blocks of information in the cache memory. Each of the 16 blocks of data in the memory has a unique four-bit code in the stack. The stack is reordered each time the cache memory 25 is accessed so that the code for the most recently accessed block of data is on the top of the stack. Therefore, when there is a need to bring instructions or data into the cache memory 25, the bottom code in the stack 123 is looked at as an indication of the block of the cache memory in which the new information may be stored, thus replacing the least recently used information in the cache memory. This technique is in accordance with the known "least recently used" (LRU) algorithm used in cache memories.

The memory management unit 53 is, according to the preferred embodiment, a translation lookaside buffer that operates in a manner very similar to that of the cache memory 25. An address associative memory 131, along with a validity tag memory 133, receives the logical page address in the bus 55. If there is a match between that logical page address and one in the memory 131, one of the 16 lines 135 is enabled, thereby specifying the physical frame address to be outputted onto the bus 57 and thence to the physical address bus 39. The information contained in the memory 137 is the physical frame address corresponding to the logical page address in the memory portion 131, each of the 16 stored translations having been obtained from the logical/physical translation table of external memory. These memory portions are connected by a bus 143 to a four-bit wide stack 145 that operates in the same manner as described with respect to the stack 123 of cache memory 25. The buses 135 and 143 are directly connected.

When a logical page address presented on the bus 55 is found in the associative memory 131, an output in the line of the bus 135 for that particular block causes a positive output in the line 141 of an OR-gate 139. This output is used by the ALU control circuit 71. This records a "hit". Similarly, if a "miss" occurs, the logical/physical conversion for a logical page of address is read in from the external memory into the block space of earlier portions 131 and 137 that has been least recently used, thus displacing an infrequently used translation table.

The function of the TLB 53 is shown in FIG. 6. The logical address word 147 appears in the logical address bus 51 of FIG. 1. The offset bit Nos. 0-9 are passed directly by ten lines of the bus 59 of FIG. 1 to form offset bits 0-9 of a physical address word 149 as shown in FIG. 6. That is, the offset bits of the logical address are not translated but directly become the offset bits of the physical address word 149. The page address bits 10-31 of the logical address word 147 (FIG. 6) are communicated by the bus 55 to the associative memory 131 of FIG. 1. A corresponding physical frame portion (bits 10-31) of the physical address is outputted in the line 57. Bits 30 and 31 of the physical address have special control functions described below, but the remaining bits 10-29 specify the physical frame of the external memory in which the desired instruction or data resides.

Carried in an attribute memory 138, as part of the physical frame word, are six bits of attributes, as illustrated in word 151 (FIG. 6). These are control bits which are used in the operation of the circuit, as described below. The attributes word 151 is communicated over bus 140 from the memory 138. The information contained in the four protection bits of the attributes word 151 is given in the table of FIG. 7. The result is to protect specified physical address frames of information in the external memory from access, reading or writing, in various combinations given in that table.

Operation of the processor of FIG. 1 in some detail can best be understood by reference to the flow diagram of FIG. 2. The flow diagram of FIG. 2 is divided into six parts, one describing each of the processor pipelined stages. The first function, executed by the first pipeline stage, is to fetch an instruction (part of a controlling computer program provided by the user of a computer system using the processor 15) to be executed. A first step 201 causes the physical program counter 45 to be incremented to the next address. It is then decided, at a step 203, whether the instruction at that physical address is capable of being temporarily stored in the cache memory 25. For example, the instruction will not be stored in cache memory if the NC bit is set in the attributes word 151 for the instruction's memory page. If it is an instruction which uses a cache memory 25, a next step 205 asks whether the physical address of the program counter 45 matches an address within the associative memory 105 of the cache memory 25. If so, a next step 207 is to check whether the data validity bits in the memory portion 103 for the address block of data are set. If so, the instruction at that physical address is read from a block of data stored in the memory 101, at a step 209. At that point, the instruction register 115 contains the instruction and the function of the first pipeline stage has been completed. The instruction is now presented on the bus 41. A subsequent pause at a step 211 may occur if a subsequent stage of the pipeline processor is not ready to perform the next step.

There are two alternative paths in the instruction fetch machine cycle to that just described. One alternative path will be taken if it is determined at step 203 that the instruction is the type which is not to be placed in cache memory. If not, the instruction is fetched directly from the external memory, as indicated by block 213. It is then loaded from bus 43 through an internal bus (not shown) of memory 101 to bus 113 and then directly into the instruction register 115, with the same result as before; that is, the instruction is placed on the instruction bus 41 by the function of the block 215, in order to be ready for the next pipeline stage.

The second alternative path initially begins at step 205 if it is determined that there is no physical address in the cache memory 105 that matches that of the program counter 45. In this case, the instruction must be loaded from external memory. A first step 217 of this process determines from the stack 123 the block of instruction or data information in the cache memory 25 that has been least recently used. This is then the block of information that is going to be replaced with information from the external memory that includes the desired instruction. The physical address of the program counter is then loaded into the associative memory 105 and the validity tag bit in the memory portion 107 associated with that memory block is marked valid. This occurs in a step 219, followed by a step 221 in which the validity bits for that block of data are cleared from the memory portion 103. This latter step then indicates that the information in that block of the memory 101 is not good information.

The step 207 is then encountered, and since the validity bits in the memory 103 have been cleared, the answer to the question 207 is "no". A step 223 then fetches the desired instruction from external memory. At step 225, this instruction is loaded into the cache memory portion 101. Subsequently, in step 227 the validity bits in the memory portion 103 are set for that instruction. The instruction is then read from the cache by a step 209, as explained above.

Therefore, no matter which of the three paths is followed in the initial pipeline stage operation, the result is the same: an instruction is fetched from the memory, either external or on-chip cache, and loaded into the instruction register 115 so that it appears on the instruction bus 41. The next step for that instruction is indicated by the instruction decode cycle of FIG. 2. The instruction decoding circuits 47 decode the instruction on the bus 41, as indicated by a step 231 of FIG. 2. As indicated by step 233, the decoded instruction is formed into control words on the control buses 65 and 61 for advancing the logical and physical program counters 45 and 63, and to specify through the address ALU control circuitry 67 the function that is to be performed by the address ALU in a next processor cycle. A possible wait state 235 is provided in case the next processor stage is not ready to continue with this instruction.

While the instruction decode cycle of steps 231 and 233 is being accomplished on the first instruction, the instruction fetch machine cycle previously described is operating on the next instruction to be executed. That is, there is simultaneous operation of these two pipeline stages (and the other four as well) of the processor according to different instructions, thus increasing the speed of operation.

The third processor pipeline operation is the address calculation cycle, as illustrated in FIG. 2. A first step 237 of this cycle is to determine whether the instruction that has been previously decoded requires that data be fetched from memory. If not, the address calculation is avoided and the steps dropped down to an optional waiting state 239 such as is provided at the end of each of the other pipeline cycles. If memory data is required, a next step 241 determines the inputs of the address ALU 49. One input can be certain fields of the instruction itself from the instruction bus 41, such as those specifying addresses and/or displacements. The other is placed on the bus 81 from any of several sources, including one of the general purpose registers 79, the logical program counter 63, or one of the control registers 83. These inputs are specified by the instruction itself and the control words decoded from it. A next step 243 is for the address ALU 49 to calculate the logical address of data to be fetched. That address appears on the logical address bus 51.

Once the logical address of the desired data is known, a decision 245 is made as to whether address translation by the TLB 53 is necessary. It will normally occur, but in cases where the logical and physical addresses are made to be the same, the processing jumps to the end of the address calculation cycle before the wait state 239. In the usual case, the processing proceeds to a step 247 where the logical address previously calculated and placed on the logical address bus 51 is compared with that of the associative memory 131 of the memory management unit 53. If there is a positive match, the next step 249 reads the frame address onto the bus 57 and thus forms the complete 32-bit physical address word 149 as illustrated in FIG. 6, on the physical address bus 39. The protection bits 3-7 of the physical attributes, as stored in the TLB 53, are then examined in a step 251. If the data at the calculated physical address is protected against reading by the code in those bits, the processing stops by reference to a process page fault 253. The operating system must then take over. If the protection attribute bits do not prohibit the desired read, however, then the processing proceeds. At the end of the third stage of the pipeline processor, therefore, the physical address of the data to be fetched in accordance with the previously decoded instruction exists on the physical address bus 39.

However, if there is no match in the associative memory 131 in the step 247, that portion of the translation table must be read into the TLB 53 memory from external memory. A first step 255 of this process is to determine from the stack 145, in accordance with the least recently used algorithm, the translation entry in the memories 131 and 137 that has been the least recently used. A next step 257 is to fetch that entry of the translation table from the external memory. At step 259, the validity of the page table entry as received from external memory is determined by examining a bit controlled by the operating system. An invalidity will cause a process page fault 253 from which the operating system must recover the process.

If the page table entry is determined to be valid in step 259, a next step 261 loads the logical page address into the TLB memory 131 and it is marked valid in the memory portion 133. Next, the physical frame of the translation table in external memory associated with that logical page address is loaded in the TLB memory 137 in the same block as the logical address. From then on, the process is the same as described previously, going through the steps 249, 251 and the wait state 239, if necessary.

The next step of the processor, in the fourth pipeline processor stage, is to fetch the operand (data) from the external memory at the physical address calculated by the immediately preceding processing cycle. The first question 265 is whether the instruction requires any data from memory at all. If not, the processing jumps toward the end of the cycle to a step 267 wherein a control word for the execution ALU is generated from the decoded instruction previously obtained in order that the ALU will know for the next processor cycle what it is to do with the data presented at its input.

If the instruction does require fetching data from external memory, a question 271 is asked as to whether the data at the determined physical address can be loaded into the cache memory 25. For example, the data will not be stored in cache memory if the NC bit is set in the attributes word 151 for the data memory page. Also, if the bit 31 of the physical address (the I/O data bit of the physical address 149 of FIG. 6) is in one state, it indicates that the data is in an input/output device rather than memory, and the data is not brought into the cache since it is subject to change. If non-cachable, processing jumps to a step 273 wherein the data is fetched from the external memory and a next step 275 loads that data into the temporary input data register 27. The processing then jumps to the step 267, as previously described.

The step 271 also checks the value of bit No. 3 of the physical attribute word 151. This bit is set to indicate when the addressed frame of data is also accessible by another processor. If it is, the frame is not loaded into the cache memory 25 and the processing jumps to step 273.

If at the step 271 it is determined that the data may be in the cache, the same processing as previously described in the first instruction fetch machine cycle of FIG. 2 is accomplished, except that data is being loaded from the external memory into the cache in this fourth processor cycle while an instruction was being loaded in the first processing cycle. The blocks of FIG. 2 in the fourth cycle that have functions corresponding to those of the first cycle are marked with the same reference number, but with a prime (') following the number. At the conclusion of that common routine, the data is in cache and subsequent step 274 reads the data at the previously calculated physical address from the cache memory 101 into the temporary input buffer 27.

At the end of the fourth processor cycle, it can be seen that the execution ALU 75 is ready to execute the instruction. The control signal which tells the ALU 75 what calculation is to be made has been formed and presented by the execution ALU control 71 in a step 267. Any external data necessary to execute the instruction is now resident in the input data buffer 27. Therefore, a first step 276 of the execution cycle (the fifth processor cycle) is to select the two inputs to the ALU 75. If data has been fetched from the external memory, one of those inputs is most likely to be that external data through the bus 89. Another input is most commonly the contents of one of the general purpose registers 79. The ALU 75 then calculates the resultant operand in a step 277, and that result is presented on its output bus 91.

A final step 279 of the execution cycle is to write this resultant operand either into one of the general purpose registers 79 or into the temporary output data buffer 29, in response to the particular instruction being executed. A wait state 281 is optionally provided at the end of the execution cycle as well.

The sixth and final processor step is to store the operand that results from the ALU 75 calculation. A step 283 calls for setting the flags in the flag and control word (FCW), as illustrated in FIG. 5(A). The FCW word is stored in a dedicated control register within the control registers 93. The stored flags are of a standard type, pertaining to the sign of the resultant operand, whether there is a carry, and so forth.

A next step 285 is to determine whether the resultant operand calculated by the ALU 75 is to be written to external memory. If not, the process is ended. If it is to be written to external memory, a step 287 which follows does so. A next step 289 is to determine from the physical address bit 31 of the data being written to external memory whether it is of the type that may be stored in the cache memory 25. If not, the cycle ends. But if the data may be stored in the cache memory 25, a further step 291 compares the physical address of the data being written into external memory with that in the associative memory 105 of the cache 25. If there is no positive comparison, that means that data at the location just written into external memory does not also exist in the cache. But if there is a positive comparison, this shows the necessity to update the cache so that the data in it at that physical address is the same as that in the external memory at that address. Thus, after checking to see whether the data validity bits are set, in a step 293, a step 295 writes the data into the cache memory 101 so that it will correspond with the updated information in the external memory. With that, the six individual processing cycles are completed for one controlling program instruction. The process has ideally taken six processor cycles of two clock cycles each, but could be longer under conditions previously described. In any event, all six processing cycles described are operating simultaneously on six different items, either simple program instructions or portions of complex instructions.

Several of the steps described with respect to the flow diagram of FIG. 2 require fetching information (instruction, data or logical/physical address translation table) from an external memory. Steps 213 and 223 call for fetching an instruction from external memory. Step 257 requires fetching a translation table, and steps 223' and 273 require fetching data from the external memory. In all of these steps, the details of the steps of fetching information from external memory are essentially the same and illustrated in the flow diagram of FIG. 3. This fetching routine allows two different types of external memory to be automatically accessed in accordance with their different characteristics. A differing amount of time necessary to wait after addressing a memory before data is read from it is taken into account. Also, one memory may be 16 bits wide, such as commonly used with ROM's for economy, and another memory 32 bits wide, such as preferably used for the main RAM for speed.

There are two control points which specify the different wait state and external bus width during memory fetches. One is bit 30 of the physical address word 149, as shown in FIG. 6. A first step 301 of the fetching routine of FIG. 3 is to determine the state of that bit. That bit is set for each physical address consistent with the characteristics of the memory at that address.

Depending upon the state of that physical address bit, one of two paths is taken. In one path, a step 303 looks at bits 0-2 of the HICR control register. (See FIG. 5). This step reads the length of wait that has been set in that register consistent with the characteristics of one of the two different memory types for which provision is made. With an opposite result of the bit 30 in the physical address, as determined in step 301, a different path is taken wherein a step 305 looks at the wait states set in bit 4-6 of the HICR register.

Following step 303 in one of the paths, a next step 307 looks at bit number 3 of the HICR word (Figure 5(B)) which is set to one state or the other depending upon whether the memory type whose characteristics set by all of the bits 0-3 of the HICR word is sixteen or 32 bits in width. Similarly, in the other processing path, following the step 305, a step 309 looks to the state of bit number 7 of the HICR register.

Depending upon the states of the bits 3 and 7 of the HICR word, the result of the processing step 307 or 309 is to proceed along either a path 311 or path 313, as shown in FIG. 3. The path 311 is the result of a determination that the memory to be accessed is 16 bits wide. Subsequent processing then passes only 16-bit long words over the system bus 11 between the central processing unit and that particular external memory. The alternate path 313 is the result of a determination that the external memory being accessed is 32 bits wide. Thus, the determination of the bus width for a particular memory access and fetch is determined both by a bit number 30 of the physical address of the information being accessed, as well as the characteristics of the memory that are stored in the HICR control register. The ability to accomplish this is made possible by having the memory management unit 53 (FIG. 1) as part of the chip so that the physical address bit may be easily and quickly accessed in the subroutine of FIG. 3.

After the 16- or 32-bit path is chosen, the physical address of the memory location to be accessed is placed on the system bus 11 in a step 315 in the 16-bit path and a step 317 in the 32-bit path. A next step 319, in the 16-bit path, and 321, in the 32-bit path, is to wait a period of time determined by that determined in the step 303 or 305 which was previously taken. A next step 323 in the 32-bit path is to fetch the entire 32 bits of information from the memory, and that is the end of the subroutine for that path.

In the 16-bit path, a step 325 fetches 16 bits of information from the external memory, and then asks whether as part of the single memory access another 16-bit word is necessary to be fetched. It will be in the case where the information to be fetched is 32 bits long. In that case, the physical address is incremented in step 329 to a new 16-bit memory location and that 16-bit word is brought into the buffer of the chip. If a second access is not required, the process ends after the step 327.

When writing data to memory, as in the step 287 of FIG. 2, essentially the same process is followed. This process is shown in FIG. 4 wherein the steps corresponding to those already described with respect to FIG. 3 are given the same reference numeral but with a prime (') added thereto. A difference necessarily exists in the order of steps 319' and 325' in the 16-bit path, and 321' and 323' of the 32-bit path, in where the wait step is placed.

The external control lines 17 and 19, indicated on FIGS. 1 and 10, communicate with the memory and other external components of a complete computer system as to whether the information being communicated on the system bus 11 is 16 or 32 bits wide. Also, a standard read/write control line 21 is also communicated with these external chips.

Another controllable logical addressing feature is illustrated with respect to FIGS. 8 and 9. The size and format of the logical address utilized on the logical address bus 51 are identified for the address ALU 49 by a bit of the FCW control register that is indicated in FIG. 9. Logic circuits within the ALU 49 are connected to the FCW register 93 (connection not shown in FIG. 1) in order to be controlled by that bit. That bit tells the ALU 49 which bits of a logical address presented to it are to be involved in an address calculation. If this bit is a "1", the address ALU 49 is configured to operate upon a full linear 32-bit address shown in Figure 8(A). The result on bus 51 of an address calculation is also 32 bits. This configuration is standard for full 32-bit processing.

A "0" in that FCW control bit causes the ALU 49 to be configured to use a 32-bit address which is segmented according to either of the formats shown in FIGS. 8(B) or 8(C). In each of these cases, the ALU 49 operates on only the offset bits of the logical address and passes through the segment bits without alteration.

The choice between those two segmented address formats is made by the state of the bit 31 of the address itself. If that bit is 0, the address ALU 49 recognizes the logical address format of FIG. 8(B) wherein the 32-bit address is split equally between offset and segment portions. If bit 31 is a 1, the ALU 49 operates on a larger number of offset bits of that address, in accordance with the format of FIG. 8(C). The formats of FIGS. 8(B) anad 8(C) are useful when the central processing unit is using programs written for other processors using segmented addresses. One such processor is the Z8000 central processing unit of Zilog, Inc., which uses the format of FIG. 8(B). With the "0" value of the FCW bit (see FIG. 9), the address ALU 49 can operate upon both address formats of FIGS. 8(B) and 8(C) interchangeably in a single program. This makes available a large number of segments (32,896), some of which (FIG. 8(C) format) are quite large (16 MBytes each).

The preferred structure of the address ALU 49 includes 32 adder circuits, one for each of the logical address bits. For the 16 most significant address bits, the logical address output is selected either from the adder associated with that bit, or directly from the input address, as specified by the FCW bit and the most significant address bit described above. In the case of a linear address (FIG. 8(A)), all bits of the output of the ALU 49 are selected from the adders associated with those bits. In the case of the segmented address of FIG. 8(B), the 16 most significant output bits are selected from the input address bits (bypassing the adders for those bits) and the remaining 16 bits are selected from the adders associated with those bits. In the case of the segmented address of FIG. 8(C), the 8 most significant ALU output bits are selected from the input address bits and the remaining 24 bits are selected from the adders associated with those bits.

A circuit portion of the address ALU 49 for accomplishing this is shown in FIG. 10. An adder circuit is provided for each of the 32 bits, such as exemplary adders 351, 353, 355, 357 and 359 for address bits 31, 30, 24, 23 and 16, respectively. The two inputs to each adder come from a corresponding line of each of the buses 41 and 81. An output of each adder for the most significant bits 16–31 becomes one input to a multiplexor, such as multiplexors 361, 363, 365, 367 and 369, the other input being the associated input line of the bus 81. The outputs of the multiplexors are bit lines 16-31 of the logical address bus 51. The least significant bit lines 0-15 of the address ALU 49 output bus 51 come directly from the output of their respective adder, no multiplexor being utilized with those bit lines.

An OR-gate 371 has an output line 373 whose signal controls the state of the multiplexors in each of the bit lines 16-23. One input line 375 to the OR-gate 371 carries the value of the mode control bit of the FCW register, while the other is the most significant bit line of the bus 81 (bit 31 of FIGS. 8(B) and 8(C)). Therefore, if either bit 31 or the FCW bit is a "1", the multiplexors for bit lines 16-23 select their respective adder outputs; thus making the ALU 49 operable with logical addresses of the type shown in eith FIG. 8(A) or 8(C). When both inputs are "0", the input bit lines of the bus 81 are connected around the adder, directly to the output bit lines of bus 51; thus making the ALU 49 operable with addresses of the FIG. 8(B) type.

The FCW control bit line 375 is connected to control the multliplexors for bit lines 24-31. When that bit is a "1", the outputs of their respective adders are connected to those lines of the bus 51; thus making the ALU 49 operable with addresses of the FIG. 8(A) type. When that bit is "0", the outputs are connected directly to their respective input lines from the bus 81; thus making the ALU 49 operable with addresses of the Figure 8(C) type.

The example system of FIG. 11 utilizing the processor 15 just described can include a number of components not yet mentioned. A separate extended processing unit 401 is, for example, designed to perform floating point arithmetic functions while operating in parallel with the CPU 15. The EPU 401 is designed to identify and execute those instructions intended for it, thus freeing the CPU 15 to perform other activities. This increases the overall performance of the system.

Several peripheral input/output circuits are also connected to the system bus 11. A serial communications controller 403 interfaces between the bus 11 and its associated peripherals 405. A universal peripheral controller chip 407 is similarly situated between the bus 11 and its peripherals 409. A counter/timer and parallel input/output chip 411 is similarly connected. A first-in, first-out input/output chip 413 can be utilized to communicate with another central processing unit or a peripheral 415. A direct memory access chip 417 may also be added. Another central processing unit 419 may be connected to the system bus 11 through interface circuitry 421, if desired. The flexibilities of choices of chips that can be used with the central processing unit is great. The architecture of the CPU 15 makes possible numerous specifically configured, high performance computing systems.

Although specific examples of the various aspects of the present invention have been described with respect to the drawings, it will be understood that the invention is entitled to protection within the full scope of the appended claims.

It is claimed:

1. A central processing unit that operates to fetch and execute a program instruction in a plurality of successive processor cycles and which includes means for connection with an external memory through a system bus, said central processing unit comprising as part of a single integrated circuit chip:

first stage means for determining the physical external memory address of a desired instruction to be executed and fetching that instruction from a first on-chip buffer memory having a capacity that is a small fraction of that of said external memory, second stage means coupled to the first stage means and responsive to the instruction fetched from said first memory in a previous processor cycle by said first stage means for decoding that instruction, third stage means coupled to the second stage means responsive to the instruction decoded in a previous processor cycle by said second stage means for determining the physical external memory address of data to be accessed, fourth stage means coupled to the third stage means and responsive to the data physical address determined in a previous processor cycle by said data third stage means for fetching that data from said first memory, fifth stage means coupled to the fourth stage means and to the second stage means and responsive to the instruction decoded by said second stage means and data fetched by said fourth stage means in previous processor cycles for executing the decoded instruction on the fetched data in order to obtain a result, sixth stage means coupled to the fifth stage means and responsive to the result obtained by said fifth stage means in a previous processor cycle for storing that result, and means connected with each of the foregoing six means for causing said six means to simultaneously operate on different program instructions, whereby a six stage parallel processing pipeline is provided.

2. The central processing unit according to claim 1 wherein said third stage means includes a second on-chip buffer memory having a capacity that is a small fraction of that of said external memory, said second on-chip buffer memory containing a portion of a table stored in external memory for translating a logical address of desired data decoded from an instruction by said second stage means into a physical address of said data in external memory.

3. The central processing unit according to claim 1 wherein said first on-chip memory includes:

means responsive to the physical external memory address of a desired instruction or data for determining whether that instruction resides in said first memory, and means responsive to determining that the desired instruction or data does not reside in said first memory for fetching the instruction or data from the external memory at the determined physical address and loading it into said first memory in place of another instruction or data stored therein prior to fetching said instruction or data therefrom, whereby the most actively used portion of the external memory is maintained on the chip for rapid access.

4. The central processing unit according to claim 2 wherein said second on-chip memory includes:

means responsive to the logical address of desired data for determining whether a portion of the translation table including that logical address resides in said second memory, and means responsive to determining that the desired portion of the translation table does not reside in said second memory for fetching the desired portion from the external memory and loading it into said second memory in place of another table portion prior to determining therefrom the physical external memory address of the data to be accessed, whereby the most actively used portion of the logical/physical address translation table in the external memory is maintained on chip for rapid access.

5. The central processing unit according to claim 1 wherein said first stage means includes a counter that is incremented according to the physical address of said desired instruction.

6. A central processing unit including means for connecting to an external memory through a system bus, said external memory containing instructions, data and a logical/physical address translation table, said central processing unit comprising as part of a single integrated circuit chip:
- an internal bus connected to said system bus connecting means,
- a first arithmetic logic unit having inputs and an output, said first unit including means for presenting at its output a specified computation of address information presented at its inputs,
- a second arithmetic logic unit having inputs and an output, said second unit including means for presenting at its output a specified computation of data presented at its inputs,
- means connected to said internal bus for storing a portion of the data and instructions contained in the external memory and their physical addresses, said data and instructions storing means including means for reading out at an output data and instructions contained therein in response to their addresses being presented at an address input,
- means having an input connected to the output of said first arithmetic logic unit for storing a portion of the logical/physical address translation table contained in the external memory, said translation table storing means including means for reading out at an output a physical address corresponding to a logical address applied to the input thereof,
- means for applying logical addresses to the inputs of said first arithmetic logic unit,
- means responsive to an indication of an absence of an applied logical address from said translation table storing means for loading from external memory through the internal bus a part of the address translation table including a desired logical address,
- means connected to said translation table storing means output for applying said physical address to the address input of said data and instructions storing means, thereby to generate an output of data in said data and instructions storing means that has that address,
- means responsive to an indication of a lack of data in said data and instructions storing means at the physical address at the output of said translation table storing means for loading into said data and instruction storing means from said external memory at least the data having said physical address,
- means including a program counter for applying a physical address of a desired instruction to the input of said data and instructions storing means, thereby to output the instruction that has that address,
- means responsive to an indication of an absence of the physical address applied to the data and instruction storing means by either the program counter or the translation table storage means for loading from said external memory at least the data or instructions having the missing physical address, and
- means including a decoder for receiving an instruction at the output of said data and instructions storing means and specifying the computation to be performed by the first and second arithmetic logic units.

7. A central processing unit that operates to fetch and execute a program instruction in a plurality of successive processor cycles and which includes means for connection with an external memory through a system bus, said central processing unit comprising as part of a single integrated circuit chip:
- first means for determining the physical external memory address of a desired instruction to be executed and fetching that instruction from a first on-chip buffer memory having a capacity that is a small fraction of that of said external memory,
- second means coupled to said first means and responsive to the instruction fetched from said first memory in a previous processor cycle by said first means for decoding that instruction,
- third means coupled to said second means and responsive to the instruction decoded in a previous processor cycle by said second means for determining the physical external memory address of data to be accessed, said third means comprising means including a first arithmetic logic unit responsive to said decoded instruction for calculating said data address,
- fourth means coupled to said third means and responsive to the data physical address determined in a previous processor cycle by said third means for fetching that data from said first memory,
- fifth means coupled to said fourth means and to said second means and responsive to the instruction decoded by said second means and data fetched by said fourth means in previous processor cycles for executing the decoded instruction on the fetched data in order to obtain a result, said fifth means comprising means including a second arithmetic logic unit responsive to the fetched data for calculating said result,
- sixth means coupled to said fifth means and responsive to the result obtained by said fifth means in a previous processor cycle for storing that result, and
- means connected with each of the foregoing six means for causing said six means to simultaneously operate on different program instructions.

8. A central processing unit that operates to fetch and execute a program instruction in a plurality of successive processor cycles and which includes means for connection with an external memory through a system bus, said central processing unit comprising as part of a single integrated circuit chip:
- first means for determining the physical external memory address of a desired instruction to be executed and fetching that instruction from a first on-chip buffer memory having a capacity that is a small fraction of that of said external memory,
- second means coupled to said first means and responsive to the instruction fetched from said first memory in a previous processor cycle by said first means for decoding that instruction,
- third means coupled to said second means and responsive to the instruction decoded in a previous processor cycle by said second means for determining the physical external memory address of data to be accessed, said third means includes a second on-chip buffer memory having a capacity that is a small fraction of that of said external memory, said second on-chip buffer memory containing a portion of a table stored in external memory for translating a logical address of desired data decoded from an instruction by said decoding means into a physical address of said data in external memory, said second on-chip memory including:

means responsive to the logical address of desired data for determining whether a portion of the translation table including that logical address resides in said second memory, and means responsive to determining that the desired portion of the translation table does not reside in said second memory for fetching the desired portion from the external memory and loading it into said second memory in place of another table portion prior to determining therefrom the physical external memory address of the data to be accessed, whereby the most actively used portion of the logical/physical address translation table in the external memory is maintained on chip for rapid access, fourth means coupled to said third means and responsive to the data physical address determined in a previous processor cycle by said third means for fetching that data from said first memory, fifth means coupled to said fourth means and to said second means and responsive to the instruction decoded and data fetched in previous processor cycles for executing that instruction on that data in order to obtain a result, and sixth means coupled to said fifth means and responsive to the result obtained in a previous processor cycle for storing that result.

9. The central processing unit according to claim 8 wherein said third stage means and said fifth stage means include separate arithmetic logic units.

10. The central processing unit according to claim 8 wherein said first on-chip memory includes:

means responsive to the physical external memory address of a desired instruction or data for determining whether that instruction resides in said first memory, and means responsive to determining that the desired instruction or data does not reside in said first memory for fetching the instruction or data from the external memory at the determined physical address and loading it into said first memory in place of another instruction or data stored therein prior to fetching said instruction or data therefrom, whereby the most actively used portion of the external memory is maintained on the chip for rapid access.

* * * * *

UNITED STATES PATENT AND TRADEMARK OFFICE
CERTIFICATE OF CORRECTION

PATENT NO. : 4,794,524
DATED : December 27, 1988
INVENTOR(S) : Carberry, et al.

It is certified that error appears in the above-identified patent and that said Letters Patent is hereby corrected as shown below:

Col. 16, line 10: "stage means" should be

--stage means and--

Col. 16, line 17: "by said data" should be --by said--

Signed and Sealed this

Twenty-third Day of May, 1989

*Attest:*

DONALD J. QUIGG

*Attesting Officer*   Commissioner of Patents and Trademarks